US012636894B2

(12) United States Patent
Maezawa

(10) Patent No.: US 12,636,894 B2
(45) Date of Patent: May 26, 2026

(54) IMAGE FORMING APPARATUS

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 124 days.

(21) Appl. No.: 18/660,180

(22) Filed: May 9, 2024

(65) Prior Publication Data

US 2024/0383261 A1 Nov. 21, 2024

(30) Foreign Application Priority Data

May 19, 2023 (JP) ................................ 2023-083112

(51) Int. Cl.
*B41J 2/21* (2006.01)
*B41M 5/00* (2006.01)
*B41J 2/175* (2006.01)

(52) U.S. Cl.
CPC .......... *B41J 2/2114* (2013.01); *B41M 5/0017* (2013.01); *B41J 2002/17589* (2013.01)

(58) Field of Classification Search
CPC .... B41J 2/2114; B41M 5/0011; B41M 5/0017
See application file for complete search history.

(56) References Cited

U.S. PATENT DOCUMENTS

2003/0218656 A1* 11/2003 Yamazaki ............ B41J 2/17566 347/43
2013/0293645 A1* 11/2013 Yasu ...................... B41J 2/2114 347/101
2014/0253651 A1 9/2014 Akiyama et al.
2020/0156389 A1* 5/2020 Kojima .................... B41J 11/04

FOREIGN PATENT DOCUMENTS

JP 2014172218 A 9/2014

* cited by examiner

*Primary Examiner* — Scott A Richmond
(74) *Attorney, Agent, or Firm* — Studebaker Brackett PLLC

(57) ABSTRACT

An inkjet recording apparatus includes an ink head unit, a precoating liquid head unit, and a control part. The ink head unit ejects ink to a printing base material conveyed along a predetermined conveying direction. The precoating liquid head unit is disposed on an upstream side of the ink head unit in the conveying direction and ejects precoating liquid to the printing base material. The control part controls the precoating liquid head unit to eject the precoating liquid. The control part controls the precoating liquid head unit to eject a predetermined amount of the precoating liquid when a glossiness of the printing base material is a predetermined value or more.

4 Claims, 3 Drawing Sheets

FIG. 3

| | Manufacture, Model Number | GLOSSINESS | PRECOATING TREATMENT | ADHESION |
|---|---|---|---|---|
| PRESENT EXAMPLE 1 | Toray Industries, Inc. LUMILER #50-S10 | 133.6 | PERFORMED | ○ |
| PRESENT EXAMPLE 2 | Toray Industries, Inc. TOLEPHAN #50-2500H | 89.7 | PERFORMED | ○ |
| PRESENT EXAMPLE 3 | TOYOBO CO., LTD. GW703#135 | 31.4 | PERFORMED | ○ |
| PRESENT EXAMPLE 4 | Oji Paper Co., Ltd. MIRROR COAT GOLD 84.9g/CM³ | 23.9 | NOT PERFORMED | ○ |
| PRESENT EXAMPLE 5 | NEION Film Coatings Corp. WHITE PET50-SDG | 23.7 | NOT PERFORMED | ○ |
| COMPARATIVE EXAMPLE 1 | Toray Industries, Inc. LUMILER #50-S10 | 133.6 | NOT PERFORMED | × |
| COMPARATIVE EXAMPLE 2 | Toray Industriies, Inc. TOLEPHAN #50-2500H | 89.7 | NOT PERFORMED | × |
| COMPARATIVE EXAMPLE 3 | TOYOBO CO., LTD. GW703#135 | 31.4 | NOT PERFORMED | △ |

IMAGE FORMING APPARATUS

INCORPORATION BY REFERENCE

This application is based on and claims the benefit of priority from Japanese patent application No. 2023-083112 filed on May 19, 2023, which is incorporated by reference in its entirety.

BACKGROUND

The present disclosure relates to an image forming apparatus which forms an image on a printing base material by an inkjet method.

In an inkjet type image forming apparatus, in order to enhance adhesion between the ink and the printing base material, a precoating treatment in which a precoating liquid is applied is generally performed.

In this case, the ejection amount of the precoating liquid may be determined based on the type of ink and the amount of ink ejected onto the printing base material per unit area. This improves the abrasion resistance of the printing base material on which the image is formed.

The adhesion between the printing base material and the ink depends on the characteristics of the printing base material in addition to the type of ink and the ejection amount of ink per unit area.

SUMMARY

An inkjet recording apparatus according to the present disclosure includes an ink head unit, a precoating liquid head unit, and a control part. The ink head unit ejects ink to a printing base material conveyed along a predetermined conveying direction. The precoating liquid head unit is disposed on an upstream side of the ink head unit in the conveying direction and ejects precoating liquid to the printing base material. The control part controls the precoating liquid head unit to eject the precoating liquid. The control part controls the precoating liquid head unit to eject a predetermined amount of the precoating liquid when a glossiness of the printing base material is a predetermined value or more.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 3 is a table showing an evaluation result for adhesion of the ink.

DETAILED DESCRIPTION

Hereinafter, an image forming apparatus according to one embodiment of the present disclosure will be described with reference to the drawings.

Figure 1:
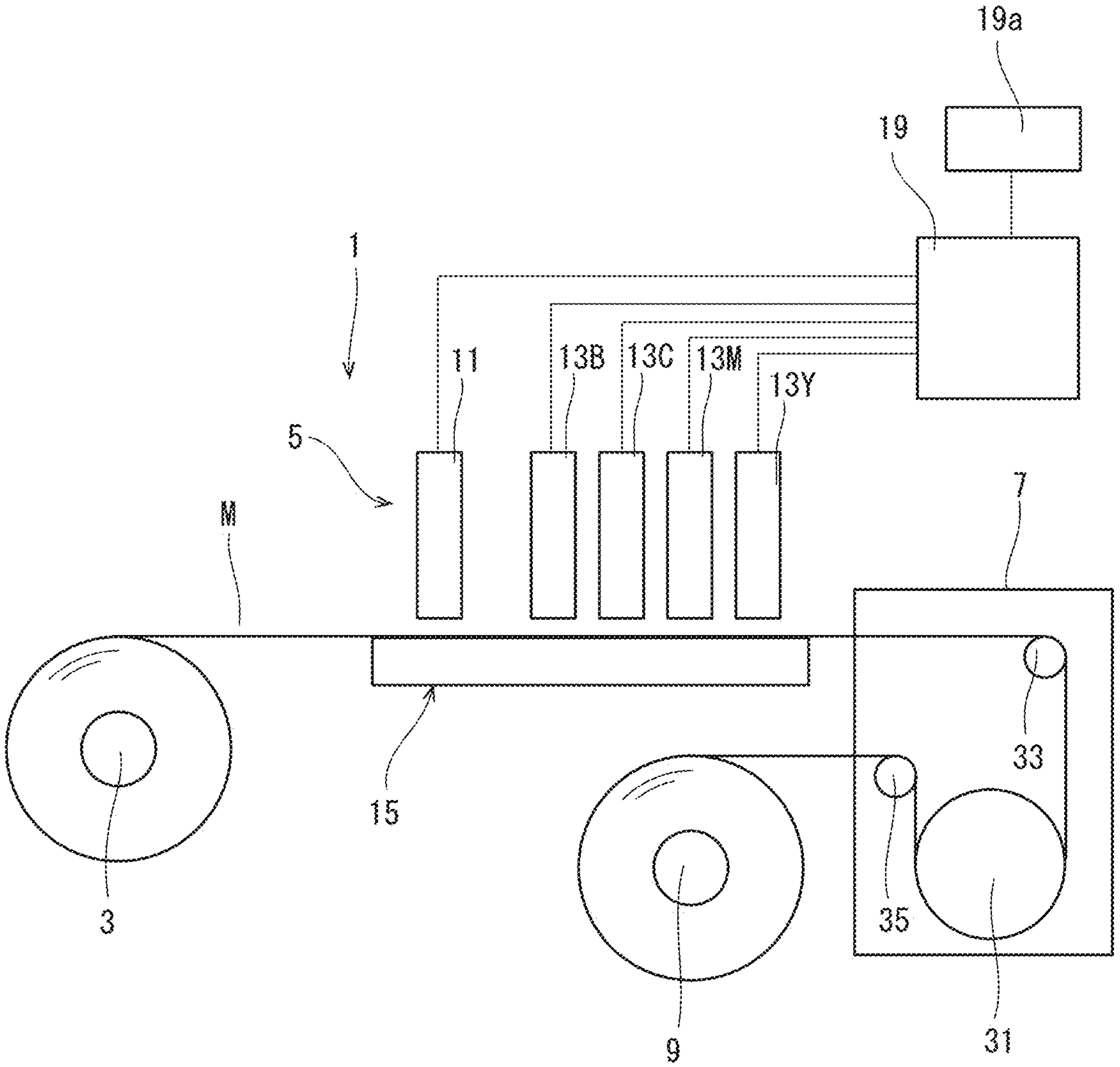
FIG. 1 is a front view schematically showing an image forming apparatus according to one embodiment of the present disclosure.

With reference to FIG. 1, the entire structure of the image forming apparatus 1 will be described. FIG. 1 is a front view schematically showing an internal structure of the image forming apparatus 1.

The image forming apparatus 1 includes a feed roller 3 around which a long printing base material M is wound, an image forming part 5 which forms an image on the printing base material M fed from the feed roller 3, in an inkjet method, a drying part 7 which dries the image formed by the image forming part 5, and a rewinding roller 9 which winds the printing base material M dried by the drying part 7.

The printing base material M is wound and mounted on the feed roller 3. By rotating the feed roller 3, the printing base material M is fed out in a predetermined conveying direction.

The image forming part 5 is disposed on the downstream side of the feed roller 3 in the conveying direction. The image forming part 5 includes one precoating liquid head unit 11, four ink head units 13B, 13C, 13M, and 13Y (collectively referred to as the ink head unit 13), a conveying plate 15 on which the printing base material M is conveyed, and a heating part 17 which heats the conveying plate 15.

The precoating liquid head unit 11 is disposed on the upstream side of the ink head units 13 in the conveying direction. The precoating liquid head unit 11 and the ink head units 13 have the same structure. The head units 11, 13 are electrically connected to a control part 19.

Figure 2:
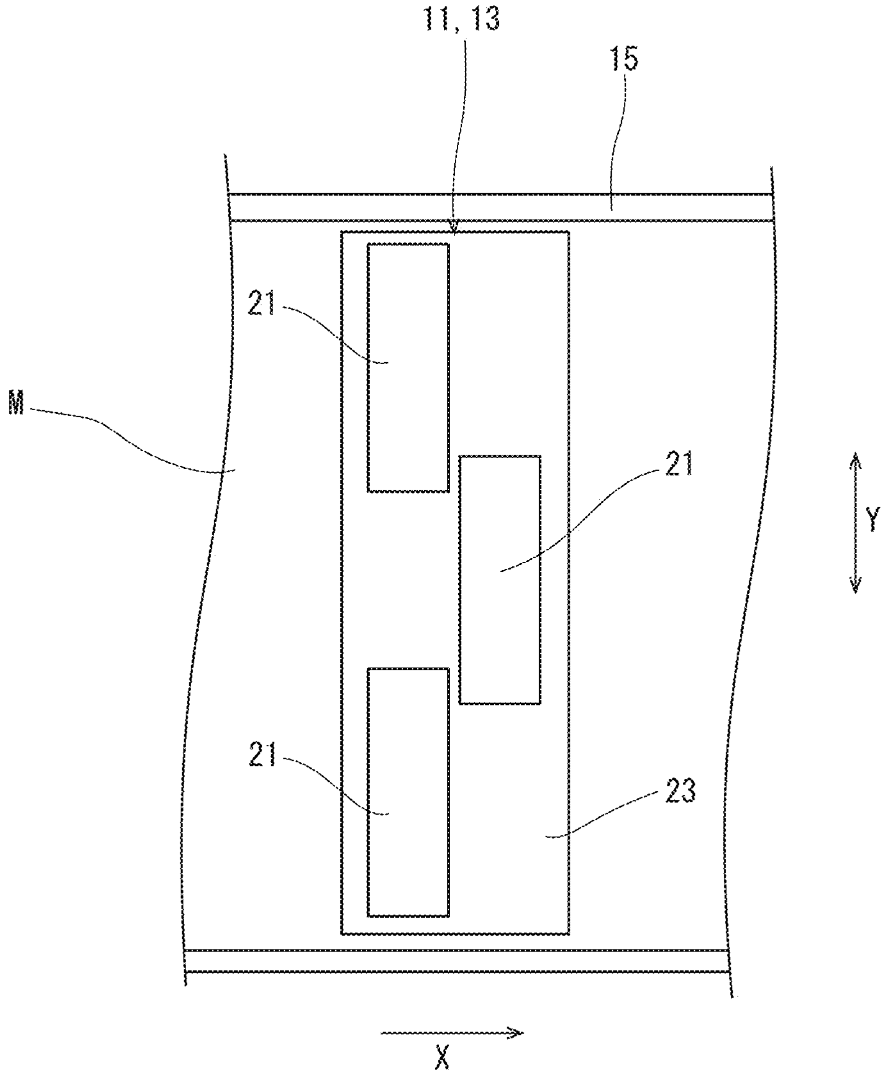
FIG. 2 is a plan view showing a print head, in the image forming apparatus according to the embodiment of the present disclosure.

As shown in FIG. 2, the precoating liquid head unit 11 and the ink head units 13 each include three print heads 21 and a plate 23 for supporting the three print heads 21. FIG. 2 is a plan view showing the head unit.

As shown in FIG. 2, the three print heads 21 are arranged in a staggered shape along the width direction Y (a direction intersecting the conveying direction X) so as to have the same width as the width of the printing base material M (a length along the width direction Y) (a line head system), and are supported by the plate 23. Each print head 21 includes a number of nozzles (not shown). The ejection ports of the nozzles are opened to the lower surface of the print head 21.

The precoating liquid is supplied to each print head 21 of the precoating liquid head unit 11. The supplied precoating liquid is ejected downward from the ejection port of each print head 21. The components of the precoating liquid are, for example, 10% polyester resin (Trade name, PESRESIN A-640, manufactured by TAKAMATSU OIL&HAT CO., LTD.), 0.04% surfactant (Trade name, Surfynol 440, manufactured by Nisshin Chemical co., ltd.), 25% propylene glycol, and 64.96% water.

The four ink head units 13B, 13C, 13M, and 13Y are arranged in order along the conveying direction X, and black, cyan, magenta, and yellow inks are supplied, respectively. The supplied ink is ejected downward from the ejection ports of each print head 21.

With reference to FIG. 1 again, the conveying plate 15 is disposed below the precoating liquid head unit 11 and the ink head units 13. The upper surface of the conveying plate 15 is formed flat. As shown in FIG. 2, the width of the conveying plate 15 is wider than the width of the printing base material M and all the head units 11 and 13. The conveying plate 15 is made of, for example, metal.

The printing base material M fed from the feed roller 3 is conveyed below the precoating liquid head unit 11 and the ink head units 13 along the upper surface of the conveying plate 15.

The drying part 7 is disposed on the downstream side of the image forming part 5 in the conveying direction. The drying part 7 includes a heat drum 51 and upstream and downstream tension rollers 53, 55 disposed on the upstream side and the downstream side of the heat drum 51. The printing base material M passed through the image forming part 5 is wound around the heat drum 51 between the upstream and downstream tension rollers 53, 55. The heat drum 51 is heated to dry the printing base material M conveyed along its surface.

The rewinding roller 9 is disposed on the downstream side of the drying part 7 in the conveying direction. One end of the printing base material M is fixed to the rewinding roller 9. The rewinding roller 9 is connected to a motor (not shown) and rotated. By rotating the rewinding roller 9 in a predetermined direction at a predetermined rotational speed by the motor, the printing base material M is fed from the feed roller 3. The fed printing base material M passes through the image forming part 5 and the drying part 7, and is wound by the rewinding roller 9.

As described above, the control part 19 controls the head units 11, 13. Further, the control part 19 is provided with an input unit 19*a* such as a display panel. The input unit 19*a* includes a glossiness input unit for inputting the glossiness (for example, 20° glossiness) of the printing base material M.

The image forming operation of the image forming apparatus 1 having the above configuration will be described. In the image forming operation, the user first inputs the glossiness (20° glossiness) of the printing base material M to the input unit 19*a* of the control part 19. The control part 19 controls the precoating liquid head unit 11 so as to eject a predetermined amount of the precoating liquid when the input glossiness is 25 or more.

Thereafter, the motor is driven to rotate the rewinding roller 9, and the printing base material M is fed from the feed roller 3 to the image forming part 5. In the image forming part 5, the printing base material M is conveyed along the upper surface of the conveying plate 15. When the printing base material M is conveyed below the precoating liquid head unit 11, the control part 19 controls the precoating liquid head unit 11 to eject a predetermined amount of the precoating liquid to the printing base material M, based on image data. On the other hand, when the input glossiness is less than 25, the control part 19 controls the precoating liquid head unit 11 so as not to eject the precoating liquid. That is, if the input glossiness is less than 25, the precoating treatment is not performed.

Thereafter, the printing base material M is conveyed below the ink head units 13, and the ink of a predetermined color is ejected from the corresponding ink head unit 13 based on the image data. The ink reacts with the precoating liquid, making it difficult to move from the landing position. The printing base material M on which the image is formed in the above way is conveyed to the drying part 7. The ink is completely dried in the drying part 7. Thereafter, the printing base material M is wound around the rewinding roller 9.

As described above, according to the present disclosure, the precoating treatment is performed only when the glossiness of the printing base material M is not less than a certain level, specifically, when the 20° glossiness of the printing base material M is not less than 25. The printing base material M having a 20° glossiness of 25 or more is, for example, a plastic film. When the glossiness is high as described above, adhesion between the ink and the printing base material M is reduced. The printing base material M having a low glossiness has fine irregularities on its surface, and the ink easily enters into the irregularities (anchoring effect), thereby enhancing the adhesion between the ink and the printing base material M. For example, in the case of the printing base material M having a 20° glossiness less than 25, such as a paper, it is not necessary to perform the precoating treatment.

However, in the case of a plastic film or synthetic paper having a 20° glossiness of 25 or more, the precoating treatment for enhancing the adhesion between the ink and the printing base material M is required. Therefore, by performing the precoating treatment only when the 20° glossiness is 25 or more, the adhesion between the printing base material M and the ink can be enhanced, and the precoating treatment be efficiently performed.

Next, an experiment for evaluating the relationship between the glossiness and the adhesion in the image forming apparatus 1 of the present embodiment will be described. As the precoating liquid, the one containing the above components (10% Polyester resin (Trade name, PESRESIN A-640, manufactured by TAKAMATUS OIL&FAT CO., LTD.), 0.04% surfactant (Trade name, Surfynol 440, manufactured by Nisshin Chemical co., ltd.), 25% propylene glycol, 64.96% water) is used.

As for the glossiness, the printing base material M is placed on the white area of the concealment ratio test paper (manufactured by TP Giken Co., Ltd.), and the 20° glossiness is measured using a glossiness meter (Trade name, J480T-268, manufactured by Elcometer).

The peeling test is carried out by the following method. The cyan solid image is printed on the printing base material M at 600 dpi. The printed image is subjected to the peeling test based on JIS K 5600 (no cross cut is formed). The tape (Trade name, CT, manufactured by NICHIBAL Co., Ltd.) is rubbed firmly onto the image with the fingertip, and the tape is pulled off within 5 minutes, or the end of the tape is grasped at an angle close to 60 degrees, and the tape is pulled off securely within 0.5 to 1.0 seconds.

The unused tape and the pulled off tape are pasted on the copy paper (Trade name, C2, manufactured by FUJIFILM Business Innovation Japan Corp.), and the image density is measured using the image density meter (Trade name, FD-5, manufactured by Konica Minolta, Inc.). The table of FIG. 3 shows the evaluation result, in which the case where the difference in image density between the unused tape and the peeled off tape is less than 0.005 is defined as o, the case where the difference is less than 0.15 is defined as Δ, and the case where the difference is 0.15 or more is defined as x. In the present examples 1 to 5, the precoating treatment is performed when the glossiness is 25 or more, and the precoating treatment is not performed when the glossiness is less than 25. On the other hand, in the comparative examples 1 to 3, the precoating treatment is not performed regardless of the glossiness.

From the table, it is confirmed that in the present examples, when the glossiness is 25 or more, good adhesion can be obtained by performing the precoating treatment, and when the glossiness is less than 25, good adhesion can be obtained without performing the precoating treatment. In other words, as shown in the present examples 1, 2 and the comparative examples 1, 2, it is confirmed that the precoating treatment is necessary in order to obtain sufficient adhesion when the glossiness is high. As shown in the present example 3 and the comparative example 3, when the glossiness is relatively low, even without performing precoating treatment (the comparative example 3), the degree of decrease in adhesion is low (Δ), but good adhesion (o) can be obtained by performing the precoating treatment (the present example 3). From the evaluation results, it is confirmed that the good adhesion can be obtained without performing the precoating treatment when the glossiness is approximately 25 or less (the present examples 4, 5).

The control part 19 may control the precoating liquid head unit 11 so as to increase the amount of the precoating liquid to be ejected as the glossiness is higher. In this case, even when the glossiness is high and the adhesion with the ink is low, the effect of the precoating treatment becomes high. The image forming apparatus 1 may also be provided with a measuring part (not shown) for measuring the glossiness of the printing base material M. In this case, after the printing base material M is set, the glossiness of the printing base material M is measured by the measuring part. The control part 19 calculates an appropriate ejection amount of the precoating liquid based on the measured value, and controls the precoating liquid head unit 11 so as to eject the precoating liquid of the calculated ejection amount. In this case, the user does not have to input the glossiness.

In the above embodiment, the four ink head units 13 are used, but the present disclosure is not limited to the four colors, and may be more or less than the four colors. The head units 11 and 13 are not limited to the line head system. However, the line head system is preferable because the printing speed can be increased. A long plastic film (PET film) was used as the printing base material M, but a cut film may be used. The printing base material M may be synthetic paper or the like.

Although the present disclosure has been described: in particular embodiments, the present disclosure is not limited to the foregoing embodiments. A person skilled in the art may modify the above embodiments so long as they do not deviate from the scope and object of the present disclosure.

The invention claimed is:

1. An inkjet recording apparatus comprising:

an ink head unit which ejects ink to a printing base material conveyed along a predetermined conveying direction;

a precoating liquid head unit which is disposed on an upstream side of the ink head unit in the conveying direction and ejects precoating liquid to the printing base material; and a control part which controls the precoating liquid head unit to eject the precoating liquid, wherein the control part controls the precoating liquid head unit to eject a predetermined amount of the precoating liquid when a 20° glossiness of the printing base material is 25 or more.

2. The inkjet recording apparatus according to claim 1, wherein the control part is provided with a glossiness input part to which a glossiness of the printing base material is input.

3. The inkjet recording apparatus according to claim 1, wherein the printing base material is a plastic film.

4. The inkjet recording apparatus according to claim 1, wherein the precoating liquid head unit and the ink head unit have a same configuration.

* * * * *